(12) United States Patent
Kirkland et al.

(10) Patent No.: US 12,279,179 B2
(45) Date of Patent: Apr. 15, 2025

(54) SYSTEMS, APPARATUSES, AND METHODS FOR CONTROLLING CONNECTIONS OF SOCIAL MEDIA USERS WITH WIRELESS DEVICES AND PHYSICAL REPRESENTATIONAL OBJECTS

(71) Applicant: Joynn, LLC, San Antonio, TX (US)

(72) Inventors: Ian Kirkland, San Antonio, TX (US); Faisal Zekaria, San Antonio, TX (US)

(73) Assignee: Joynn LLC, San Antonio, TX (US)

( * ) Notice: Subject to any disclaimer, the term of this patent is extended or adjusted under 35 U.S.C. 154(b) by 357 days.

(21) Appl. No.: 17/723,214

(22) Filed: Apr. 18, 2022

(65) Prior Publication Data

US 2022/0394429 A1 Dec. 8, 2022

Related U.S. Application Data

(60) Provisional application No. 63/176,432, filed on Apr. 19, 2021.

(51) Int. Cl.
*H04W 4/21* (2018.01)
*H04W 4/02* (2018.01)
*H04W 4/029* (2018.01)

(52) U.S. Cl.
CPC .......... *H04W 4/029* (2018.02); *H04W 4/023* (2013.01); *H04W 4/21* (2018.02)

(58) Field of Classification Search
None
See application file for complete search history.

(56) References Cited

U.S. PATENT DOCUMENTS

2013/0097246 A1* 4/2013 Zifroni ................. H04W 4/029
 709/204
2016/0353237 A1* 12/2016 Shepherd ............... H04W 4/02

\* cited by examiner

*Primary Examiner* — Frantz Bataille
(74) *Attorney, Agent, or Firm* — The Kumar Law Firm PLLC; Sanjeev Kumar

(57) ABSTRACT

A system and method for controlling connections of a plurality of mobile user wireless devices of online social media users includes a connection management server receiving from a mobile application client a geolocation sharing mode selection, updating each other mobile application client with geolocation information of each mobile application client in active mode, informing each other mobile application client of intent status information of each mobile application client in active mode, and modifying on a map display an intent status modification of a property of the geolocation identifier of each mobile application client in active mode to indicate the intent status information.

25 Claims, 8 Drawing Sheets

SYSTEMS, APPARATUSES, AND METHODS FOR CONTROLLING CONNECTIONS OF SOCIAL MEDIA USERS WITH WIRELESS DEVICES AND PHYSICAL REPRESENTATIONAL OBJECTS

CROSS REFERENCE TO RELATED APPLICATIONS

This application is related and claims priority to U.S. Provisional Application 63/176,432 filed Apr. 19, 2021 and entitled SYSTEMS, APPARATUSES, AND METHODS FOR CONTROLLING CONNECTIONS OF SOCIAL MEDIA USERS WITH WIRELESS DEVICES AND PHYSICAL REPRESENTATIONAL OBJECTS, which is incorporated by reference in entirety.

FIELD OF THE INVENTION

The disclosure relates generally to systems, apparatuses, and methods for controlling connections of social media users.

BACKGROUND OF THE INVENTION

The disclosure relates to systems, apparatuses, and methods for controlling connections of users of social media platform. This disclosure, more particularly, relates to systems, apparatuses, and methods for controlling connections of users of social media platforms by operating wireless communication devices ("wireless devices") such as, for example, smartphones and tablet computing devices, in combination with secondary physical representational objects ("tangibles") such as, for example, printed cards ("cards") embodied in a fixed substrate such as paper or cardstock, or electronic media such as electronic ink. Although embodiments disclosed herein primarily relate to connecting users of social media, it is to be understood that the disclosed systems, apparatuses, and methods may have application in relation to users of wireless devices who are not users of a social media platform.

Users of social media platforms have limited capabilities to selectively connect with other users in an ad hoc manner. Some users may be comfortable arranging and engaging in face-to-face, in-person meetings with other platform users, based solely on their usage of the same platform. Other users may arrange face-to-face, in-person meetings with other users of the social media platform, based on their usage of the same platform and identity confirmation information such as, for example, shared acquaintances who can verify their identities; membership in another community such as an organization organized around work, a community-based organization, or a shared affinity such as a professional interest, hobby interest, recreation interest, or other personal interest; sharing certain verified information; or, learning that the other user resides or works in the same city or neighborhood. Many other users are uncomfortable and generally avoid or decline to consider such meetings with platform users who are not already personal acquaintances from a physical community or a different virtual community. This type of avoidance behavior by users can arise, for example, out of concern for personal safety and security. Even where users may be comfortable arranging face-to-face, in-person meetings with other users of the same platform, the users may avoid arranging or attending unscheduled in-person meetings or setting up in-person meetings at ad hoc venues other than, for example, business offices. Other users, who may be comfortable and satisfied with personal safety and security from using a platform, may choose to avoid arranging face-to-face, in-person meetings with other users of the same platform, due to perceiving that the outcomes are unlikely to be satisfactory due to dissimilarities of other users, or the time required to attend in-person meetings. Thus, for example, dozens of individuals may be simultaneously using Facebook or another social media platform when commonly located in a public venue, such as an airport or coffee shop, and remain unacquainted as if they were scattered across remote geographic locations such as a city, country or the world, rather than discovering each other and having opportunities to meet in person while located in the same venue.

The value of using a social media platform may be increased by the same platform, or a different platform, facilitating opportunities for unacquainted users, as well as users acquainted with each other, to connect for ad hoc face-to-face, in-person meetings with other users of the social media platform in a manner that can provide selected personal safety and personal effectiveness. For reasons stated above and for other reasons which will become apparent to those skilled in the art upon reading and understanding the present specification, there is a need in the art for improved social media platforms that facilitate opportunities for users to conveniently connect for ad hoc face-to-face, in-person meetings with other, unacquainted users, or acquainted users, of the social media platform in a manner that can provide selected personal safety and personal effectiveness.

BRIEF DESCRIPTION OF THE INVENTION

The above-mentioned shortcomings, disadvantages and problems are addressed herein, as will be understood by those skilled in the art upon reading and studying the following specification. This Brief Description is provided to introduce a selection of concepts in a simplified form that are further described below in more detail in the Detailed Description. This Brief Description is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In an aspect, a social media platform may be configured to, and capable of, facilitating controlled connections such as, for example, ad hoc face-to-face, in-person meetings between a first user of the platform in a host role and a second user of the platform in an invitee role, who may be acquainted or unacquainted with each other, in a manner that can provide selected personal safety measures and selected meeting effectiveness measures for the first user, second user, or both. In an aspect, a method for operating a social media platform may include facilitating controlled connections such as, for example, ad hoc face-to-face, in-person meetings between a first user of the platform in a host role and a second user of the platform in an invitee role, who may be acquainted or unacquainted with each other, in a manner that can provide selected personal safety measures and selected meeting effectiveness measures for the first user, second user, or both.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein.

DETAILED DESCRIPTION OF THE INVENTION

Figure 1:
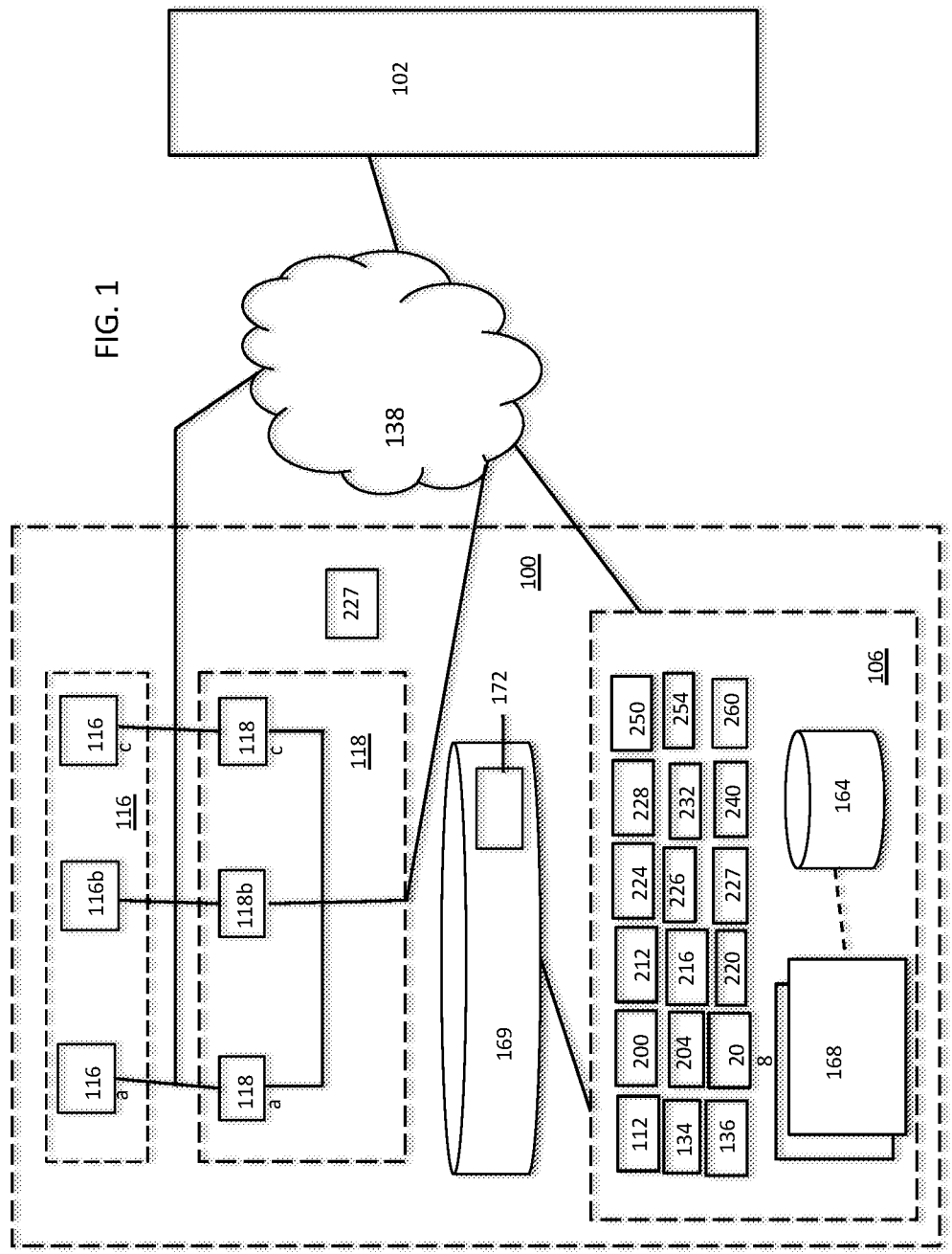
FIG. 1 is a simplified block diagram of a system for controlling connections of social media users, in an exemplary embodiment.

The following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

The terms "upper", "top", "lower", "bottom", "vertical", "horizontal", etc., are used for convenience to refer to the relative orientation of apparatus and are not intended to otherwise limit the structures described and claimed. The terms "axial", "axially", "longitudinal", "longitudinally", etc., refer to relative orientation, dimensions or both, of apparatus and are not intended to otherwise limit the structures described and claimed. The terms "radial", "radially", "lateral", 'laterally", etc., refer to relative orientation, dimensions or both, of apparatus and are not intended to otherwise limit the structures described and claimed. The terms "angle", "angular", "rotationally", etc., unless otherwise stated refer to relative orientation, dimensions or both, of apparatus and are not intended to otherwise limit the structures described and claimed. The terms "attach", "attachment", etc., pertain to engagement between assembled distinct parts of an assembly, which may be attached to each other, or detached from each other. The terms "lock", "locking", etc., pertain to preventing inadvertent displacement or detachment between parts of an assembly.

FIG. 1 is a simplified block diagram of a computer-implemented connection management system 100 (or "system" 100) for controlling connections of social media users, in an exemplary embodiment. In the particular exemplary embodiment shown in FIG. 1, connection management system 100 is independent of, and complementary to, a plurality of other social media online systems. In other embodiments (not shown), a connection management system as disclosed herein may be part of a general social media online system. Connection management system 100 may include a connection management server 106 configured to, and capable of, facilitating control of meeting connections, which may include meeting connection objects 112, in relation to a plurality of user mobile application clients ("mobile application client," "application client," "mobile application," or "user mobile application") 116 operable on respective of a plurality of user mobile wireless devices 118 ("wireless devices" or "user wireless devices") for enabling and controlling the proposal, arrangement, notification, initiation, conduct, termination and reporting of in-person meetings, in an exemplary embodiment. The connection management server 106 may facilitate the configuration of meeting connection objects 112 in relation to information regarding the plurality of user wireless devices 118, which may include facilitating user control, such as user choices, of selectable elements of meeting connection objects 112. It will be understood that meeting connection objects 112 may be data structures including user-facing information, which including user selectable elements and server-controlled elements such as, for example, platform rules. User selectable elements may include, for example, meeting connection information including location, time, and selected characteristics of invitee profiles. The plurality of mobile application clients 116 installed on user wireless devices 118, for example, may include a first user wireless device in a meeting host role and one or more second user wireless devices each in an invitee role. In embodiments, the first user and second user may be acquainted, or unacquainted, with each other. In embodiments, the connection management server 106, for example, may facilitate user control of meeting connection objects 112 that may include user connection safety constraints 130 of connections between the plurality of user mobile application clients 116. In embodiments, the connection management server 106, for example, may facilitate user control of meeting connection objects 112 that may include user meeting effectiveness constraints 136 of connections between the plurality of user mobile application clients 116.

System 100 may include the plurality of user wireless communications devices 118 ("wireless devices") capable of data communications such as text messaging (SMS) communications, voice communications, and exchange of packetized data according to a suitable communication protocol (such as, for example, Internet Protocol (IP)) over a communications network 138. For purposes of this description, the plurality of wireless devices 118 may be characterized as including enumerated user devices such as a first user wireless device, a second user wireless device, third user wireless device, and so on. Communications network 138 may include one or a plurality of interconnected wireless communication networks capable of enabling operations of smartphones and IP-enabled devices of smart wireless devices such as wireless tablet computers, smart watches, and IoT devices. Communications network 138 may include network infrastructure, such as hardware, software, links, logical connections, and the Internet, enabling communications by any suitable communication protocols.

System 100 may include connection management server 106 configured and operable for communications over the communications network 138 with the plurality of user mobile application clients 116 installed on respective of a plurality of user wireless devices 118. Connection management server 106 may include accessible memory 164 capable of storing executable instructions or steps, one or more processors or processor resources 168 ("processor") operable to execute the instructions to perform connection management functions, system storage 169, a network interface, and input/output interfaces. The connection management server 106 and components thereof may be implemented as a virtual machine and may be implemented by a cloud server resource. In an embodiment, the connection management server 106 may register the plurality of user mobile application clients 116 installed on the plurality of user mobile wireless devices 118. The connection management server 106 thus may register a first user mobile application client installed on the first user wireless device, second user mobile application client installed on the second user wireless device, and so on.

Referring to FIG. 1, connection management server 106 may include a connection management database 172. Connection management database 172 may hold connection management data stored in system storage 169 accessible by processor 168 of connection management server 106. Processor 168 may use connection management data retrieved from connection management database 172 to perform the connection management functions. The connection management database 172 may include device data of each user wireless device 118, including a unique user wireless device identifier (ID) for each user wireless device 118, and other data. Connection management database 172 may include a plurality of the meeting connection objects 112. The meeting connection objects 112 may include meeting connection data structures and data.

At least one of the connection management database 172 and each of the plurality of user wireless devices 118 may include user wireless device geolocation information 200, such as geolocation coordinates, for the plurality of user wireless devices 118. At least one of the connection management database 172 and each of the plurality of user wireless devices 118 may include geolocation active/inactive mode information 204, for the plurality of user wireless devices 118. Where geolocation active/inactive mode information 204 is "active," a geolocation indicator 208 for each user wireless device 118 is displayed on a map display 212. The map display 212 may be displayable on each user wireless device 118 in a related local geographic area. Where geolocation active/inactive mode information 204 is "inactive," a geolocation indicator 208 is not displayed on the map display 212 provided to other users in a related local geographic area. Thus, it is selection of geolocation "active" mode by a user wireless device 218, such as by receiving user input, that causes the geolocation indicator 208 to be displayed on a map display 212 provided to other user wireless devices 118 of users in a related geographic area. This capability for a user to remain unknown to other users in the related local geographic area by choosing "geolocation inactive mode" to avoid display on the map display 212 of geolocation indicator 208 for that user's wireless device 218 may be compliant with a user connection safety constraint 134. The capability for a user to remain unknown to other users in the related local geographic area by choosing "geolocation inactive mode" to avoid display on the map display 212 of geolocation indicator 208 for that user's wireless device 218 may be compliant with a user meeting effectiveness constraint 136.

For each user mobile application client 116 installed on a corresponding user wireless device 118 and having the geolocation indicator 208 in geolocation active mode, the connection management database 172, the user mobile application client 116, or both, may include intent status information 216 for the user mobile application client 116. In an embodiment, intent status information 216 for each of a plurality of user mobile application client 116 may include a selected one indicator color, from a group of indicator colors, which modifies and is displayed at each geolocation indicator 208, such as a map dot or map pin representing geolocation information, displayed on the map display 212 generated for each user mobile application client 116 to indicate geolocation information, such as geographic coordinates, for the user wireless device 118 represented by each geolocation identifier 208 such as a map dot or map pin. Intent status information 216 for the user mobile application client 116 installed on a corresponding user wireless device 118 may include intent status information 216 provided from at least one of intent status user input received by the user mobile application client 116 via a user input interface of the user wireless device 118 and intent status stored default information retrieved from the connection management database 172. For the user mobile application client 116 installed on a corresponding user wireless device 118 having the "active" mode selection for geolocation active/inactive mode information 204, the intent status information 216 may include both a status indicator 220 and intent indicator 224 for the user of the user wireless device 118. Although different status indicator 220 information may be used, in the particular embodiment shown in FIG. 1, the status indicator 220 may include gender or non-binary identity status indicator input received via an input interface, responsive to display of a user status indicator prompt, from a corresponding user operating the input interface of user wireless device 118 for the corresponding mobile application client 116 installed on the user wireless device 118 and corresponding to the user. Although different intent indicator 224 information may be used, in the particular embodiment shown in FIG. 1, the intent indicator 224 may include a platonic or romantic intent indicator input last received by an input interface, responsive to display of a user intent indicator prompt, from a corresponding user operating the input interface of user wireless device 118 for the corresponding mobile application client 116 installed on the user wireless device 118 and corresponding to the user.

Referring to FIG. 1, for a first user mobile application client 116 installed on a corresponding user wireless device 118 having the "active" mode selected for geolocation active/inactive mode information 204, with intent status information 216 including status indicator 220 (in the illustrated embodiment, being gender identity or non-binary identity information), and with intent status information 216 also including intent indicator 224 (in the illustrated embodiment, being platonic/romantic intention information), then responsive to the geolocation "active" mode information being selected, a geolocation identifier 208, such as a map dot or map pin, may be displayed on a map display 212 generated for each of a plurality of mobile application clients 116 installed on corresponding user wireless devices 118 located within a corresponding local geographic area of the first user wireless device 118 having the installed first user mobile application client 116. In the illustrated embodiment, the corresponding local geographic area is the area within a determined radius from the first user wireless device 118.

At least one of the connection management database 172 and each of the plurality of user wireless devices 118 may include user wireless device geolocation information 200, such as geolocation coordinates, for the user wireless device 118. At least one of the connection management database 172 and each of the plurality of user wireless devices 118 may include geolocation active/inactive mode information 204, for the plurality of user wireless devices 118. Where geolocation active/inactive mode information 204 is "active," a geolocation indicator 208 of the user wireless device 118 is displayed on a map display 212 of each user wireless device 118 in a related local geographic area. Where geolocation active/inactive mode information 204 is "inactive," a geolocation indicator 208 of the user wireless device 118 may be displayed on the same user wireless device 118 and is not displayed on a map display 212 of other user wireless devices 118 in a related local geographic area. Thus, it is selection of geolocation "active" mode by a user wireless device 218 that causes the geolocation indicator 208 of the same to be displayed on a map display 212 of other user wireless devices 118 in a related geographic area. This capability for a user to remain unknown to other users in the related local geographic area by choosing "geolocation inactive mode" to avoid display of geolocation indicator 208 for that user wireless device 218 is a personal safety measure available for usage by each user wireless device 218.

Referring to FIG. 1, for a first mobile application client 116 installed on a corresponding user wireless device 118 with geolocation active/inactive mode information 204 that "active" mode is selected, with intent status information 216 including status indicator 220 (gender identity or non-binary identity) information, and intent indicator 224 (platonic/romantic) information, the geolocation active mode information 204 causes a geolocation identifier 208 such as a map dot or map pin to be displayed on a map display 212 generated on a plurality of other mobile application clients 116 on corresponding user wireless devices 118 in a corresponding local geographic area, such as a local arear determined within a radius, of the first mobile application client 116. At least one displayed property, such as color, of the geolocation identifier 208 is modified to reflect the intent status information 216 including the status indicator 220 and intent indicator 224. Any other displayed property, such as size or shape, of the geolocation identifier 208 may be modified to represent and displayed the intent status information 216 including status indicator 220 (gender identity or non-binary identity) information, and intent indicator 224 (platonic/romantic) information for each mobile application client 116 having geolocation active/inactive mode information 204 wherein "active" mode is selected.

Referring to FIG. 1, in an embodiment, social media platform system 100 may include local visual signal information 143 presented in a fixed media 145. The fixed media 145 may be, for example, a media that can present the local visual signal information 143 for viewing by other users at the same venue (such as, for example, a coffee shop, bar, or airport waiting lounge) to identify the user and distinguish the user both from other individuals not using the platform, and from other platform users having different status indicator information. The fixed media 145, for example, may include a set of color indicator cards 147 identical to the group of indicator colors. The local visual signal information 143, for example, may include the set or group of indicator colors that may be identical to those displayable with a map dot or map pin on a map display generated for each of a plurality of user wireless devices. A selected one of the set of color indicator cards 147 may be exhibited by first user when using the first user wireless device 118 to provide visual indication of the intent status information 216 when other users may be in a physical location to view the exhibited color indicator card 147 presented by the first user. The set of color indicator cards 147 may be identical to the local visual signal information 143 including the group of indicator colors, which is displayed at the map dot or map pin displayed on a map interface generated for each user wireless device 218 to indicate geolocation information, representing geographic coordinates for the user wireless device 218 represented by each map dot or map pin. Intent status information 216 for the user wireless device 118 may include intent status information 216 provided from at least one of intent status user input received by the user wireless device 118 and intent status stored default information retrieved from the connection management database 172. For the user wireless device 118 in geolocation active mode 204, the intent status information 216 may include both a status indicator 220 and intent indicator 224 for the user of the user wireless device 118. Although different status indicator 220 information may be used, in the particular embodiment shown in FIG. 1, the status indicator 220 is gender or non-binary status identity indicator input last received by an input interface responsive to the user operating the input interface of user wireless device 118. Although different intent indicator 224 information may be used, in the particular embodiment shown in FIG. 1, the intent indicator 224 is a platonic or romantic intent indicator input last received by an input interface responsive to the user operating the input interface of user wireless device 118.

Referring to FIG. 1, the connection management server 106, user wireless device 118 or fixed media 145 may include a visual display of advertising such as, for example, advertising or offers for a venue, which may be the venue where users are meeting.

Referring to FIG. 1, the connection management server 106 may authorize each other user wireless device 118 located nearby within a determined distance, or in the same neighborhood or local geographic area of the first user wireless device 118, to send a connection request notification 240 to the first user wireless device 118.

Referring to FIG. 1, the connection management server 106 may authorize the first user wireless device 118 to issue a connection response 250 to each authorized connection request notification 240 received from each other user wireless device 118 located nearby within the determined distance, or in the same neighborhood or local geographic area, of the first user wireless device 118. Thus, when another user wireless device 118 is only temporarily located within, and leaves, the determined distance or the neighborhood or local geographic area, of the first user wireless device 118, authorization for the other user wireless device 118 to send a connection request notification 240 to the first user wireless device 118 is revoked by the connection management server 106.

Referring to FIG. 1, the connection management server 106 may generate a controlled queue of the plurality of connection responses 250 to all authorized connection request notifications 240 received from each other user wireless device 118 located nearby within the determined distance, or in the same neighborhood or local geographic area, of the first user wireless device 118. The plurality of connection responses 250 may include an immediate acceptance of the authorized connection request notification 240 received from another user wireless device 118, which may be based on time constraints or personal information, such as gender identity, interest indicator (platonic or romantic), and other personal information such as appearance, profession, education, religion, and personal interests, provided by each user of the plurality of other wireless devices 118 sending the authorized connection request notifications 240. The plurality of connection responses 250 may include an immediate decision to ignore the authorized connection request notification 240 received from another user wireless device 118, which may be based on any of the preceding considerations. Such a decision to ignore an authorized connection request notification 240 received from another user wireless device 118, can be considered a decision to decline the authorized connection request notification 240 without expressly informing the other user wireless device 118. The plurality of connection responses 250 may include a postponement by the first user of the decision on whether to accept or decline the authorized connection request notification 240 received from another user wireless device 118, which may be based on any of the preceding considerations. The plurality of connection responses 250 may include a postponement by the first user of the decision on whether to accept or decline the authorized connection request notification 240 received from another user wireless device 118, which may be based on any of the preceding considerations. Where a first connection response 250, that is an immediate acceptance, has been issued or granted by the first user wireless device, and a local face-to-face, in-person meeting has started, a second connection response 250 that is a meeting pause, may be issued by either or both the first user wireless device or other wireless user device of a participant in the same meeting, or by presentation of fixed media 145, such as a yellow card, to pause or temporarily stop the meeting in relation to themselves, either with or without explanation to the other participant(s). Thus, for example, if a user participating in a meeting arranged via the platform deems another user's conduct or demeanor to be inconsistent with purposes of the proposed meeting, or for any reason decides that that the meeting no longer serves his or her purposes, that user may present a pause indicator informing all other participant(s) that the user is temporarily ending or pausing his or her participation in the meeting and can disentangle from the meeting without explanation to other users participating in the same meeting. Thus, for example, a meeting participant user can present the pause connection response such as by presenting a yellow card, in the fixed media or by text message, to all other participants in the same meeting, if that user decides to depart for any reason. The connection management server 106 may track the frequency of users electing to pause their participation in meetings, to reduce misuse of the platform. In an embodiment the connection management server 106 may generate a group of controlled queues each consisting of one type of the connection responses 250.

The capability of the first user wireless device 118 to provide different connection responses 250, including the ignore connection response, the postponement connection response, and the pause connection response, are personal safety measures and personal efficiency measures provided by social media platform system 100. The personal safety measures and personal efficiency measures can be determined for each authorized connection request notification 240 received from another user wireless device 118, and may be based on time constraints or alignment of personal information, such as gender identity, interest indicator (platonic or romantic), and other personal information such as appearance, profession, education, religion, and personal interests, provided by each user of the plurality of other wireless devices 118 sending the authorized connection request notifications 240.

Referring to FIG. 1, the connection management server 106 may generate a plurality of advertisements to be presented by being displayed on the plurality of user wireless devices 118 in relation to the locations of users, time constraints and user profile information such as, for example, alignment of personal information, gender identity, interest indicator (platonic or romantic), and other personal information such as appearance, profession, education, religion, and personal interests, provided by each user of the plurality of other wireless devices 118 sending the authorized connection request notifications 240.

Referring to FIG. 1, the connection management server 106 may authorize one or a plurality of other mobile application clients 116 installed on corresponding user wireless devices 118 located nearby within a determined area, such as a radius distance, neighborhood or other local geographic area, of the first mobile application client 116 installed on a corresponding first user wireless device 118, to send a connection request notification 240 to the first mobile application client 116 installed on the corresponding first user wireless device 118. The connection management server 106 may further limit authorization of the other mobile application clients 116 installed on corresponding user wireless devices 118 located nearby within the determined area, to one or more subsets of other mobile application clients 116 installed on corresponding user wireless devices 118 having user connection profile information 228 that is aligned, correlates or corresponds to connection threshold criteria 232. The connection threshold criteria 232 may be imposed and compared to user connection profile information 228 of a plurality of other mobile application clients 116 installed on other corresponding user wireless devices 118 of other corresponding users, may include the intent status information 216 including status indicator 220 (gender identity or non-binary identity) information and intent indicator 224 (platonic/romantic) information. In addition, or in the alternative, to the intent status information 216, the connection threshold criteria 232 may include criteria for some, or all, of the user connection profile information 228 of other user mobile applications 216 for other users who are connection prospects in being located within the same local geographic area determined for the first mobile application client 118 and in having aligned intent status information 216 including status indicator 220 (gender identity or non-binary identity) information and intent indicator 224 (platonic/romantic) information that meets initial threshold criteria for alignment with the first mobile application client 118. Such user connection profile information 228 other than the intent status information 116, for example, may include age, appearance, profession, self-description, personality profile results, and personal interests.

Referring to FIG. 1, the connection management server 106 may authorize the first user wireless device 118 to issue a connection response 250 to each authorized connection request notification 240 received from each other user wireless device 118 located nearby within the determined distance, or in the same neighborhood or local geographic area, of the first user wireless device 118. Thus, when another user wireless device 118 is only temporarily located within, and leaves, the determined distance or the neighborhood or local geographic area, of the first user wireless device 118, authorization for the other user wireless device to send a connection request notification 240 to the first user wireless device 118 is revoked by the connection management server 106.

Referring to FIG. 1, the connection management server 106 may generate a controlled queue of the plurality of connection responses 250 to all authorized connection request notifications 240 received from each other user wireless device 118 located nearby within the determined distance, or in the same neighborhood or local geographic area, of the first mobile application client 116 on first user wireless device 118. The plurality of connection responses 250 may include an immediate acceptance of the authorized connection request notification 240 received from another user mobile application client 116, which may be based on time constraints, personal user connection profile information 228 compliance with connection threshold criteria 232, intent status information including status indicator (gender or non-binary identity), interest indicator (platonic or romantic interest), and/or other user connection profile information including age, appearance, profession, self-description, personality profile results, and/or personal interests, provided by each user corresponding to the plurality of other mobile application clients 116 sending the authorized connection request notifications 240. The plurality of connection responses 250 may include an immediate decision to ignore the authorized connection request notification 240 received from another mobile application client 116, which may be based on any of the preceding considerations. Such a decision to ignore an authorized connection request notification 240 received from another mobile application client 116, can be considered a decision to decline the authorized connection request notification 240 without expressly informing the other mobile application client 116. The plurality of connection responses 250 may include a postponement by the first user of the decision of whether to accept or decline the authorized connection request notification 240 received from another mobile application client 116, which may be based on any of the preceding considerations. The plurality of connection responses 250 may include a postponement by the first user of the decision of whether to accept or decline the authorized connection request notification 240 received from another mobile application client 116, which may be based on any of the preceding considerations. In an embodiment the connection management server 106 may generate a group of controlled queues each consisting of types of the connection responses 250.

The capability of the first mobile application client 116 to provide different connection responses 250, including the ignore connection response, the postponement connection response, and the pause connection response, are user safety constraints 130 and user meeting efficiency constraints 136 enabled and facilitated by social media platform system 100. The user safety constraints 130 and user meeting efficiency constraints 136, and other user safety constraints 130 and user meeting efficiency constraints 136, can be determined for each authorized connection request notification 240 received from each other mobile application client 116, and may be based on time constraints, compliance of user connection profile information 228 with threshold profile criteria 232, intent status information including status indicator (gender or non-binary identity), interest indicator (platonic or romantic interest), and/or other user connection profile information including age, appearance, profession, self-description, personality profile results, and/or personal interests, provided by each user corresponding to the plurality of other mobile application clients 116 sending the authorized connection request notifications 240.

Referring to FIG. 1, the connection management server 106 may generate a plurality of advertisements 260 to be presented by being displayed in the plurality of user mobile application clients 116 on the plurality of user wireless devices 118 in relation to the locations of user wireless devices 118, time constraints, and compliance of user connection profile information 228 with threshold profile criteria 232, intent status information including status indicator (gender or non-binary identity), interest indicator (platonic or romantic interest), and/or other user connection profile information including age, appearance, profession, self-description, personality profile results, and/or personal interests, provided by each user corresponding to the plurality of other mobile application clients 116 sending the authorized connection request notifications 240.

Referring to FIG. 1, system 100 may include the connection management server 106 configured to provide an intent status modification 226 of a displayed property of the geolocation identifier 208. The intent status modification 226 may include displayable visual indicia 227 selected from a group of displayable visual indicia each indicating different intent status information with the geolocation identifier 208 displayed on the map 212. The geolocation identifier 208, and intent status modification 226 such as displayable visual indicia 227, which may be a color indicia indicating a corresponding intent status, may be a hyperlink to such information.

Referring to FIG. 1, system 100 may include the connection management server 106 configured to present a physical display prompt 254 to a display interface of the user wireless device 118 corresponding to the first user mobile application client 116. The physical display prompt 254 may solicit user input to be received at an input of the user wireless device 118, such as a manual input key or camera imaging input, of confirmation that selected displayable visual indicia corresponding to intent status, is presented at the immediate device geolocation information 200, which may be geolocation coordinates, of the first user mobile application client 116 on first user wireless device 118 during use of the same first user mobile application client 116 at the immediate device geolocation information 200, which may be geolocation coordinates. In an embodiment, the intent status modification 226 of a displayed property of the geolocation identifier 208. The intent status modification 226 may include displayable visual indicia 227 selected from a group of displayable visual indicia each indicating different intent status information with the geolocation identifier 208 displayed on the map 212. The geolocation identifier 208, and intent status modification 226 such as displayable visual indicia 227, may be a color indicia indicating a corresponding intent status, may be a hyperlink to such information. In the particular embodiment shown in FIG. 1, the displayable visual indicia 227 is a color indicating a corresponding intent status, selected from a group of colors corresponding to different intent status. A group of displayable physical representational objects may correspond to the group of colors, such that selection of any color from the group of colors corresponding to different intent status, corresponds to selecting one of the group of displayable physical representational objects, such as color cards, having the selected color. The connection management server 106 configured to present the physical display prompt 254 thus may identify one color card to be displayed to indicate the same intent status as the intent status modification 226.

Figure 2:
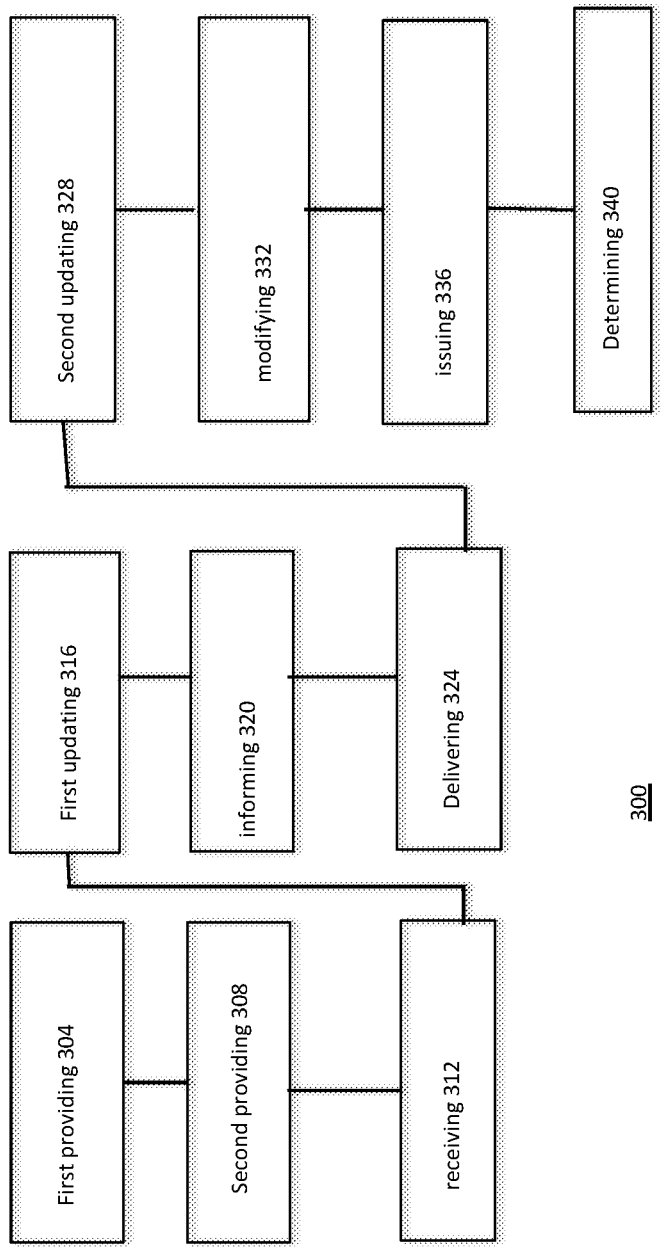
FIG. 2 is a simplified flow diagram of a method for controlling connections of social media users, in an exemplary embodiment.
Figure 3:
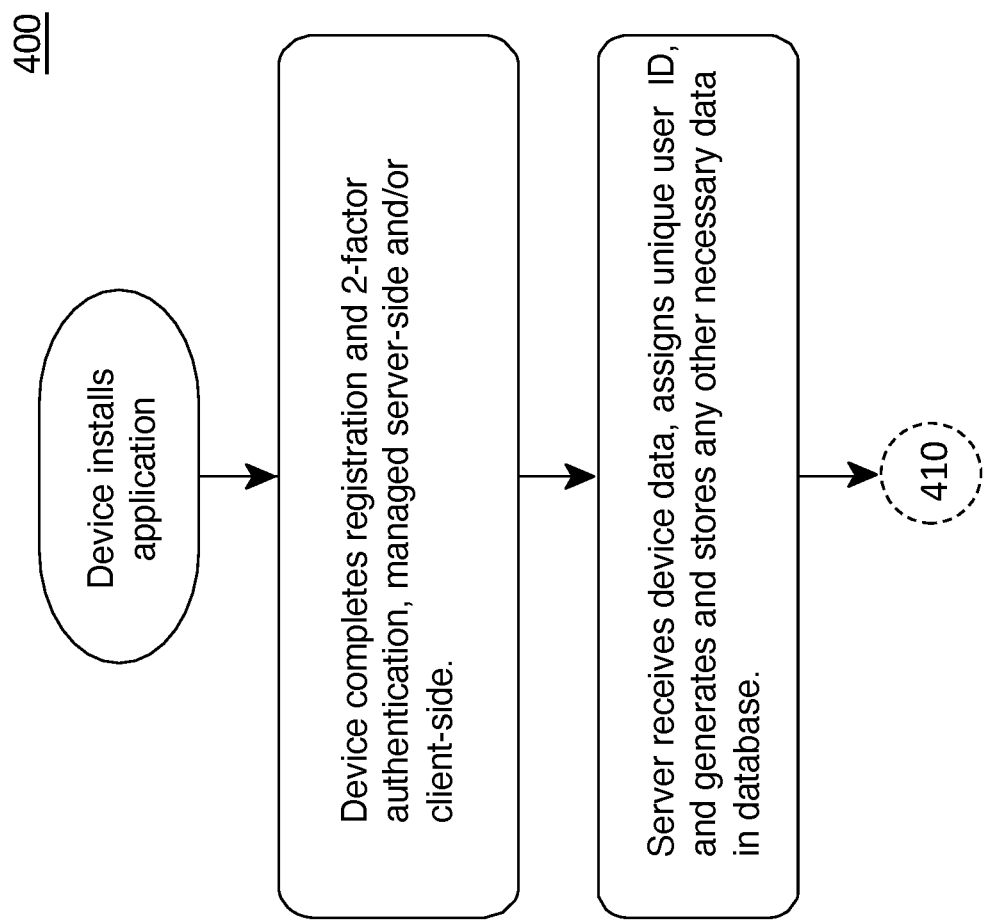
FIG. 3 is a simplified flow diagram of a method for controlling connections of social media users, in an exemplary embodiment.
Figure 4:
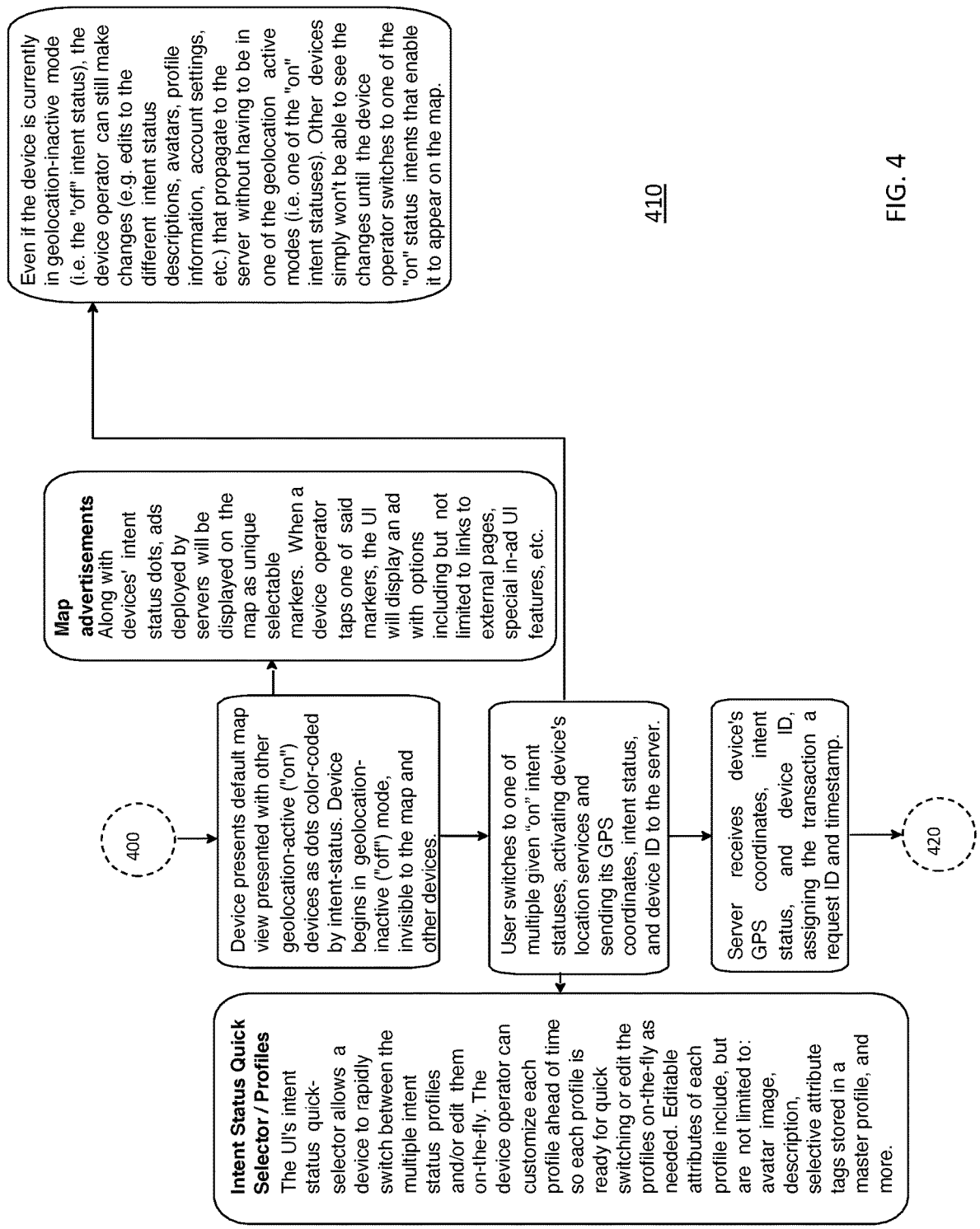
FIG. 4 is a continuation of the simplified flow diagram of FIG. 3.
Figure 5:
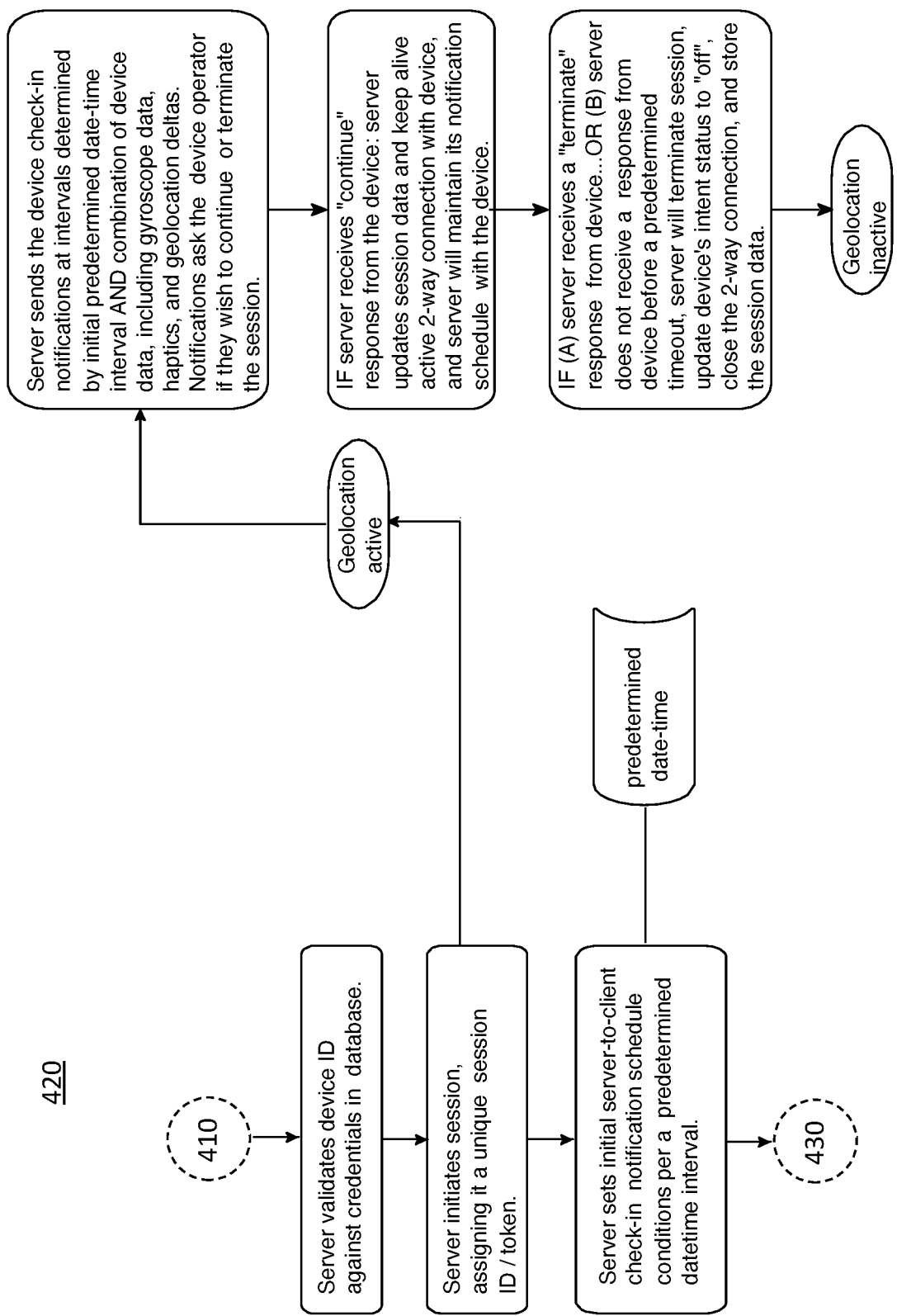
FIG. 5 is a continuation of the simplified flow diagram of FIG. 4.
Figure 6:
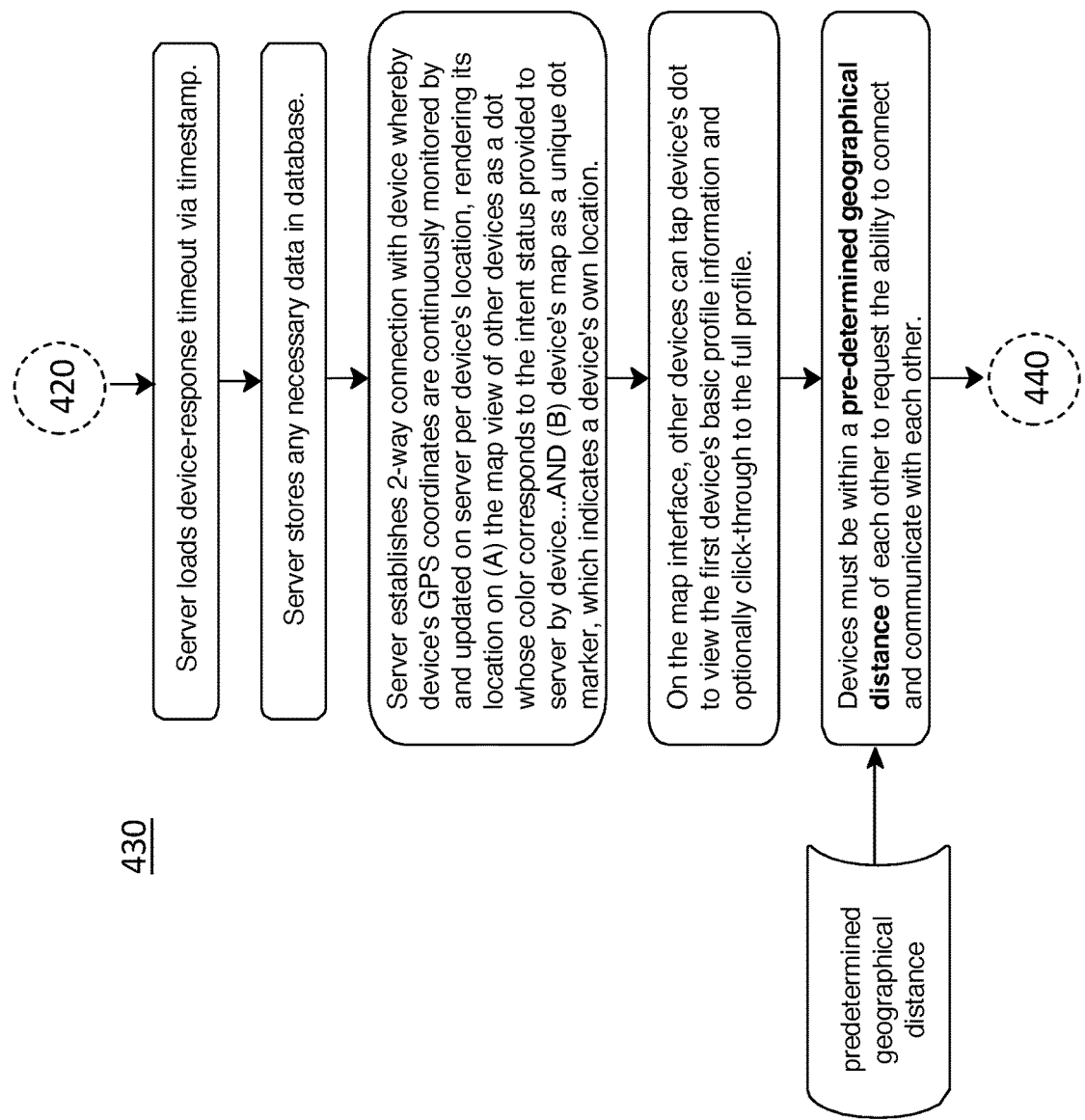
FIG. 6 is a continuation of the simplified flow diagram of FIG. 5.
Figure 7:
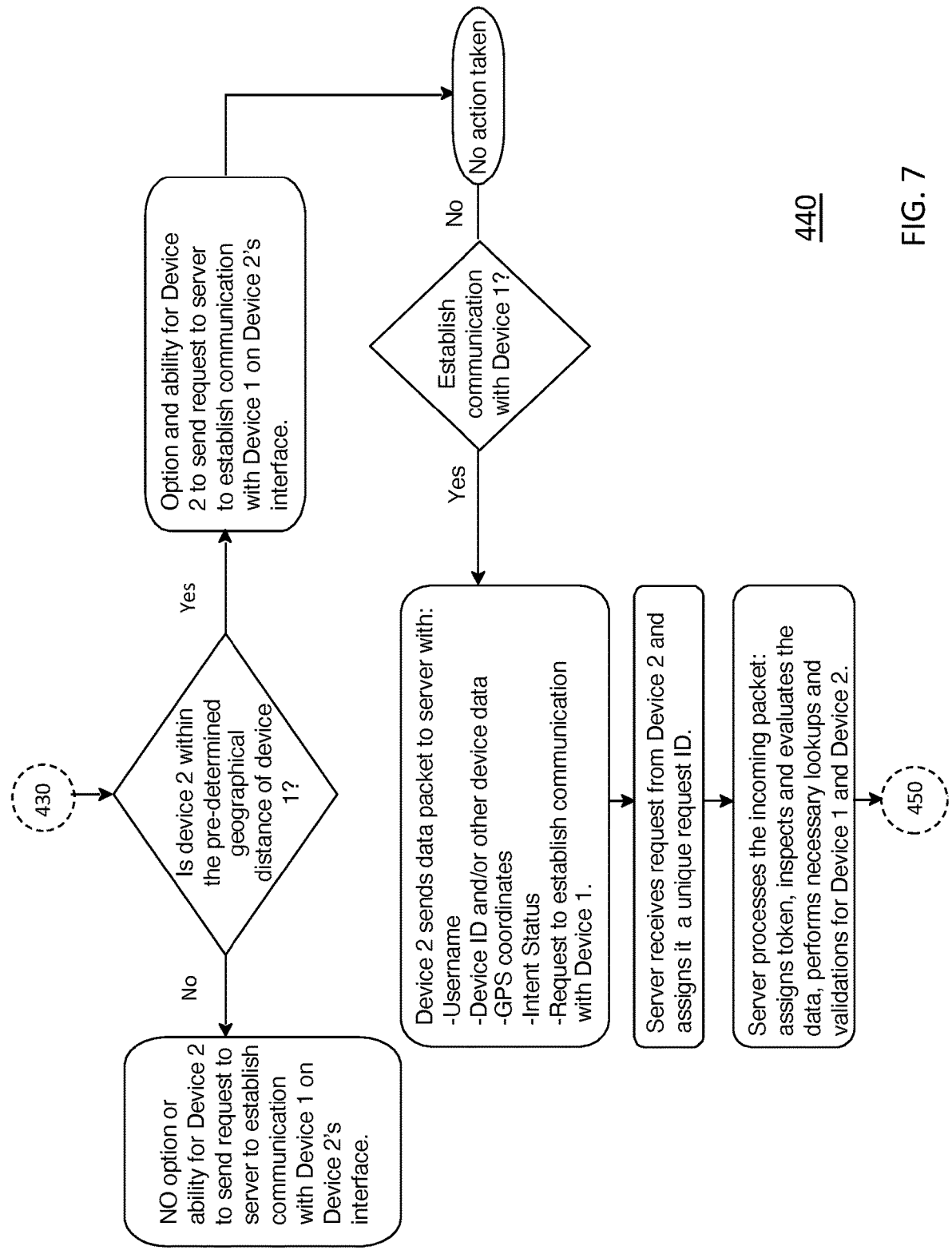
FIG. 7 is a continuation of the simplified flow diagram of FIG. 6.
Figure 8:
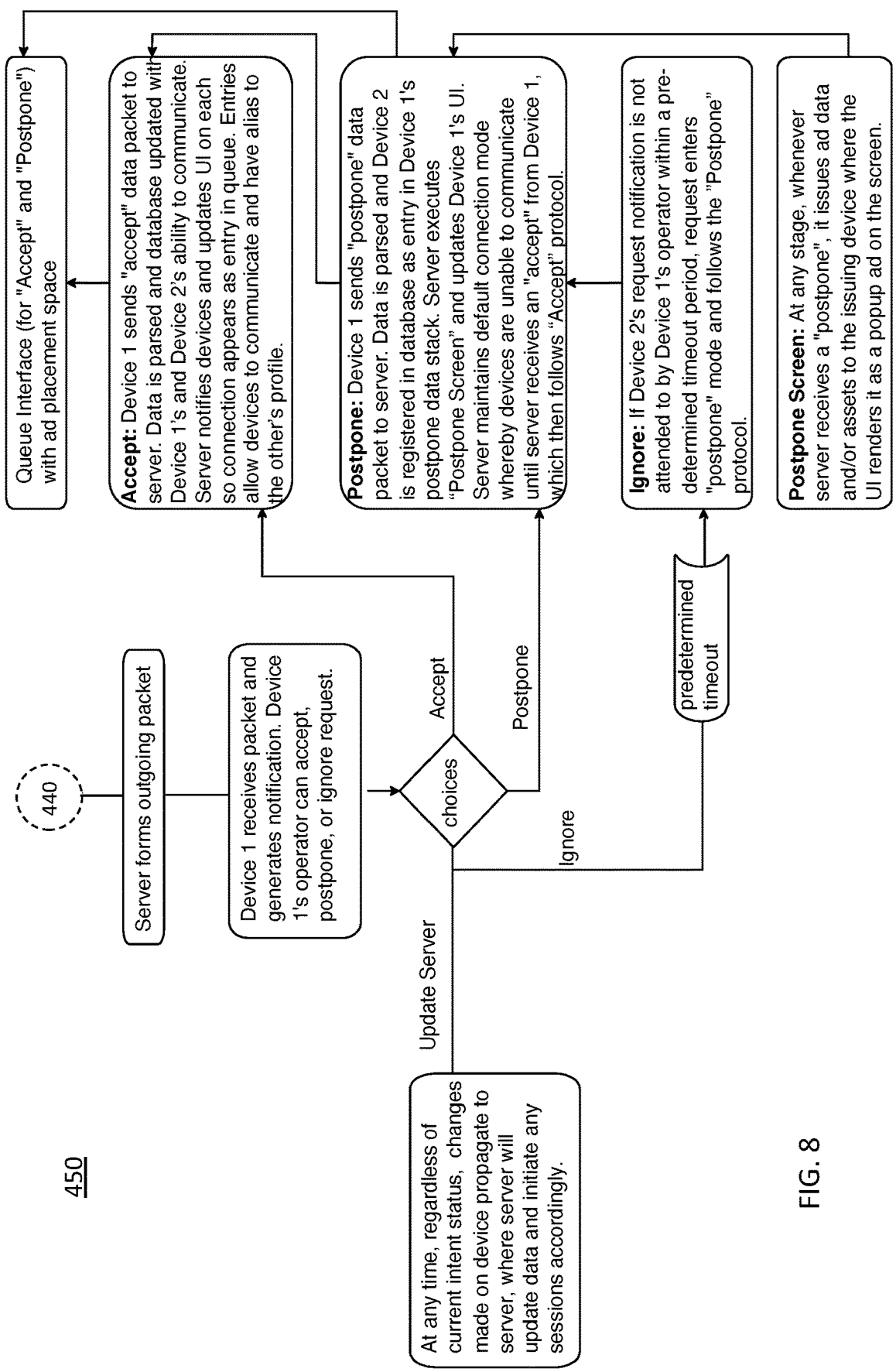
FIG. 8 is a continuation of the simplified flow diagram of FIG. 7.

FIG. 2 is a simplified flow diagram of a computer-implemented method 300 for controlling connections of a plurality of mobile user wireless devices of online social media users, in an exemplary embodiment. Method 300 may be performed by operation of a connection management system 100 as elsewhere disclosed herein. Method 300 may include: first providing 304 a mobile application client on each of the plurality of user mobile application clients installed on respective of a plurality of user mobile wireless devices. Method 300 may include: second providing 308 a connection management server in communication with the plurality of user mobile application clients, the connection management server comprising a processor, and memory coupled to the processor, wherein the memory comprises instructions executable by the processor. Method 300 may include: receiving 312, by the connection management server, from the plurality of mobile application clients, a geolocation sharing mode selection, the geolocation sharing mode selection being selected from active mode and inactive mode. Method 300 may include: first updating 316, by the connection management server, the plurality of mobile application clients, with geolocation information of each mobile application client in active mode. Method 300 may include: informing 320, by the connection management server, the plurality of mobile application clients, with intent status information of each mobile application client in active mode. Method 300 may include: delivering 324, by the connection management server, to the plurality of mobile application clients, a map display. Method 300 may include: second updating 328, by the connection management server, each map display with a geolocation identifier to indicate the geolocation information of each mobile application client in active mode. The geolocation information of each mobile application client in active mode may include geolocation coordinates of the corresponding mobile user wireless device. Method 300 may include: modifying 332, by the connection management server, a displayed property of each geolocation identifier, with an intent status modification to indicate the intent status information of the mobile application client in active mode located by the respective geolocation identifier. The intent status information may include gender status identity indicator input last received by a user input interface of the corresponding user wireless device. The intent status information may include a platonic or romantic intent indicator input last received by a user input interface of the corresponding user wireless device. The intent status modification may be selected from a group of displayable visual indicia, each indicating different intent status. The group of displayable visual indicia may include a group of colors each indicating an intent status. Method 300 may include: issuing 336, by the user mobile application client installed on a corresponding mobile user wireless device via an output thereof, a physical display prompt to request confirmation input of a displayed physical representational object during use of the user mobile application client installed on the corresponding mobile user wireless device at the geolocation coordinates, the displayed physical representational object indicating the intent status identical to the intent status modification. The group of displayable physical representational objects may correspond to the group of colors. The group of displayable physical representational objects may include a group of color cards each including a corresponding one of the group of colors. Method 300 may include: determining 340, by the connection management server, compliance with geographic location criteria for the plurality of mobile application clients, wherein the second updating 328, of the map display with a geolocation identifier to indicate the geolocation information of each mobile application client in active mode, is limited to a set of the plurality of user mobile application clients compliant with the geographic location criteria. The geographic location criteria may be distance between the mobile application client and the other mobile application client.

In an example, where a first user launches a first instance of the mobile application client on a corresponding first user mobile wireless device, a first interface of the first wireless device may display a map generated to display locations, determined from geolocation information, of all other platform user wireless devices for users who are already in active status, with corresponding geolocation indicators which may be map dots or map pins each modified by intent status modification information determined for intent status information, in a geographic area such as a selected distance between user wireless devices. Any of the aforementioned may be determined and provided by a connection management server, the plurality of user mobile wireless devices, or by combined operations of the connection management server and plurality of user mobile wireless devices. The first user mobile wireless device may receive user input by the first user turning on one of the first user's intent statuses. The first user mobile wireless device may receive user input at an input interface, by the first user turning on one of the first user's active mode intent statuses that activates sharing of geolocation information for the first user mobile wireless device. Where the first user mobile wireless device remains in inactive mode status that does not activate sharing of geolocation information for the first user mobile wireless device, the first user mobile wireless device may display other users and their intent status profiles (without turning on the first user's own intent status and/or geolocation) on the map, if the first user chooses. The first instance of the mobile application client on the first user mobile wireless device may present to the first user business advertising, such as business profiles, of local businesses or any other businesses that are advertising on the social media platform in the geographic area. If the first user wants to appear on the map for discovery by other platform users, the first instance of the mobile application client on the first user mobile wireless device may receive a user input selection of one choice among the group of intent statuses for active mode (i.e., other than the "off" or "inactive" status). When the first instance of the mobile application client on the first user mobile wireless device receives a user input selection of one choice among the group of intent statuses that are active mode, the first user's location (map dot or map pin) and first user's intent status modification (intent status color indicator modifying the geographic locator (i.e., map dot or map pin) indicating the first user mobile wireless device, that is displayed on the generated map visible to other users for the geographic area, and the other users can view that user and that user's profile where the modified geographic locator (map dot or map pin) indicating the first user's location and first user intent status modification (intent status color indicator modifying the geographic locator. Other mobile application clients on other user mobile wireless devices in the same geographic area can send connection request notifications over the wireless communications network to the first user mobile applicant client on the first user mobile wireless device, as authorized and enabled by the connection management server. The connection management server may decline authorization and decline to deliver connection request notifications over the wireless communications network from selected other mobile application clients on other user mobile wireless devices to the first user mobile applicant client on the first user mobile wireless device, according to connection rules implemented by the connection management server. Connection rules implemented by the connection management server may include declining to deliver connection request notifications where such a connection request, for example, does not comply with a geographic limit such as distance between user mobile wireless devices; gender limits; intent status limits; meeting location limits; limits for the number of meeting participants; time constraints for travel and meetings; where user privileges have been limited for non-compliance with platform rules; or where user privileges have been limited due to consistent low ratings of their personal conduct by other users. Responsive to each of the connection request notifications delivered to the first user mobile application client, the first user mobile application client may send via the first user mobile wireless device over the communication network to each other user mobile application client one of the connection responses including, for example, immediate acceptance connection response, ignore connection response, postponement response, or where an in-person meeting is already proceeding, a pause response. The connection management server may determine the form and timing of delivering the responses to each mobile application client originating a connection request notification.

In an example, a first user walking to a coffee shop may want to meet new people in the neighborhood by chatting over a cup of coffee, and avoiding people seeking romantic relationships. A connection management client on the first user wireless device may receive first user input from an input interface of the first user wireless device. A representation of the first user input may be output from the connection management client on the first user wireless device and communicated over a wireless communication network to a connection management server. The connection management server may change the first user intent status to platonic intent status, and the first user identity status to a first gender identity, in a connection management database associated with the connection management server. The first connection management client may be updated with the updated first user intent status and updated first gender identity by communication with the connection management server over the wireless communication network. A color indicator for the combination of first user intent status and first gender identity may be displayed to other users on each other wireless device at the first map dot or first map pin on the displayed map of the geographic area; at local premises at the location of the first user wireless device possessed by the first user by being displayed on fixed media (tangible) such as an orange color card identical to the color indicator for the map dot or map pin; and at local premises at the location of the first user wireless device possessed by the first user by being displayed on a first visual image output of the first user wireless device such as a representation of an orange color card identical to the color indicator for the map dot or map pin. Other users may discover the first user on the map generated on the respective mobile application client of other user mobile wireless devices in the geographic area. Some of the other mobile application clients on other user wireless devices may send connection request notifications to the first mobile application client on the first user wireless device. The first mobile application client on the user wireless device may provide a connection response, which may be an immediate acceptance, immediate decision to ignore the connection request notification, or postponement of the decision to accept or ignore the connection request notification. An in-person local meeting of participants may proceed on any topics of shared interest, such as music. When a meeting has already started, the first mobile application client of the first user mobile wireless device, or other mobile application client of another user mobile wireless device, of any user participating in the in-person meeting, may deliver a pause connection response to other users participating in the same in-person meeting, to indicate that the user is stopping her/his participation in the in-person meeting. The user mobile application client on each user mobile wireless device may present advertising to each respective user.

In an example, at a venue such as a coffee shop or other public venue, a first user may display a physical representational object, which may be a selected color card such as an orange card, to inform any other platform users in the same location that the first user is a platform user and would like to connect and participate in an in-person meeting, the first user's gender identity, first user's intent status such as platonic or romantic intent, and the first user's profile listing subjects of interest to the first user. So, other platform users at the same location, upon seeing the color card or other physical representational object, may review information provided by the connection management server and determine whether meeting the first user to participate in a meeting, is likely to be enjoyable or productive. Once a meeting begins between at least two participants, if they choose to continue displaying the color card, other platform users at the same location may recognize, from reviewing the map displayed in the client mobile application, or by seeing the color card on display, that a meeting between platform users is occurring, and may ask to join the discussion by sending a meeting request notification or may receive a meeting request notification inviting the other platform users to join and participate. For example, if the other user is a music enthusiast, and the participants are discussing music, the connection management server may deliver a meeting request notification to the other user that invites the other user to join the meeting in progress on the shared subject of music. If other subjects are being discussed, or if the participants have limited their meeting to only the two original participants, the connection management server may determine not to deliver a meeting request notification to other users.

In an example, two platform users in a meeting may chatter away about jazz and the best coffee, a third platform user walking past the meeting venue, such as a coffee shop, may notice two orange dots of the two meeting participants and find "jazz music" in the meeting description or their user profiles. The third platform user's third mobile application client may switch his status to orange and may send a connection request notification to either or both platform users participating in the connection meeting. Responsive to the connection request notification, the mobile application client of either or both existing participants may send a connection response to the third user's mobile application client on the third user mobile wireless device. The connection response may be an acceptance response, ignore response, or postponement response. The connection management server may deliver or determine not to deliver each connection response to the third user mobile application client. Any of the three participants may decide to display that user's pause response card to indicate that the user is departing the meeting. The connection management server or the user mobile application clients, or the color cards, may present advertising, such as an offer, for viewing by the meeting participants.

In another example, a first user is at the park with his child tossing a football and may invite other parents with children to participate, by operating the first user mobile application client on the first user mobile wireless device, such that the first user's intent status and an explanation are communicated to users in the same geographic location who are also parents with a child who wants to meet and participate in tossing balls.

In another example, a first user is at the lake to go fishing and decides to locate other anglers to participate in a fishing session. The first user may operate the first user mobile application client on the first user mobile wireless device, such that the first user's intent status and an explanation that the first user is located at the lake and seeking to meet one or more new acquaintances for a fishing session.

In an example, a first user is at a favorite bar and decides to locate other users to participate in a shared outing at the bar. The first user may operate the first user mobile application client on the first user mobile wireless device, such that the first user's intent status and an explanation that the first user is located at the bar and seeking to meet one or more new acquaintances for a shared outing at the bar.

In an example, a first user is at an eatery and decides to locate one other user of the opposite gender to share breakfast at the cafe. The first user mobile application client on the first user mobile wireless device may receive input from the first user, such that the first user's intent status and an explanation that the first user is located at the eatery, or going to be at the eatery, and seeking to meet a new acquaintance of the opposite gender to share breakfast at the eatery. The connection management server may determine other users of the desired gender who are located at the same eatery or likely to be nearby, who may have appropriate intent status and profile traits, and extend invitations. The invitation may be a connection request notification. One or more invitees may provide a connection response, which may be an immediate acceptance, ignore, or postponement of a decision. Advertising for businesses such as, for example, same-day offers for nearby eateries, may be provided by the connection management server and displayed by any of the user mobile application clients. Other usage context examples may include: gathering participants for impromptu parties, gathering parents and children for play sessions, notifying users of political town halls meetings, and business networking.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. A system to control connections of online social media users, the system comprising:
 a plurality of user mobile application clients installed on respective of a plurality of user mobile wireless devices;

a connection management server comprising:
  a processor; and
  a memory coupled to the processor, the memory comprising instructions executable by the processor, to:
    receive, from the plurality of mobile application clients, a geolocation sharing mode selection, the geolocation sharing mode selection being active mode or inactive mode;
    provide, to the plurality of mobile application clients, geolocation information of each mobile application client in active mode;
    provide, to the plurality of mobile application clients, intent status information of each mobile application client in active mode;
    determine, a subset of the plurality of mobile application clients in proximity to each other to receive a map display:
    provide, to the plurality of mobile application clients, the map display;
    provide, on the map display, a geolocation identifier to indicate the geolocation information of each mobile application client in active mode; and
    provide, on the map display, an intent status modification of a displayed property of the geolocation identifier of each mobile application client in active mode, the intent status modification to indicate the intent status information of the mobile application client in active mode located by the respective geolocation identifier.

2. A system according to claim 1, further comprising:
the geolocation information of each mobile application client in active mode comprising geolocation coordinates of the corresponding mobile user wireless device.

3. A system according to claim 1, further comprising:
the intent status information comprising gender status identity indicator input last received by a user input interface of the corresponding user wireless device.

4. A system according to claim 1, further comprising:
the intent status information comprising a platonic or romantic intent indicator input last received by a user input interface of the corresponding user wireless device.

5. A system according to claim 1, further comprising:
the intent status information including both a status indicator and intent indicator for the user of the user wireless device.

6. A system according to claim 5, further comprising:
the status indicator comprising gender status identity indicator input last received by a user input interface of the corresponding user wireless device.

7. A system according to claim 5, further comprising:
the status indicator comprising a platonic or romantic intent indicator input last received by a user input interface of the corresponding user wireless device.

8. A system according to claim 1, further comprising:
the intent status modification of a property of the geolocation identifier comprising displayable visual indicia selected from a group of displayable visual indicia each indicating different intent status.

9. A system according to claim 8, further comprising:
the group of displayable visual indicia comprising a group of colors.

10. A system according to claim 9, further comprising:
a group of displayable physical representational objects corresponding to the group of colors.

11. A system according to claim 10, further comprising:
the group of displayable physical representational objects comprising a group of color cards each comprising a corresponding one of the group of colors.

12. A system according to claim 11, further comprising:
the processor operable when executing the instructions to:
  issue, via an output of the corresponding mobile user wireless device, a prompt identifying one of the color cards to be displayed to indicate the same intent status modification.

13. A system according to claim 1, further comprising:
the processor operable when executing the instructions to:
  determine, for each other mobile application client, compliance with a geographic location criteria;
  wherein the providing of geolocation information to each other mobile application client is limited to a group of compliant each other mobile application client compliant with the geographic location criteria.

14. A system according to claim 1, further comprising:
the processor operable when executing the instructions to:
  wherein the geographic location criteria is distance between the mobile application client and the other mobile application client.

15. A method for controlling connections of a plurality of mobile user wireless devices of online social media users, the method comprising:
first providing a mobile application client on each of the plurality of mobile user wireless devices;
second providing a connection management server in communication with the plurality of mobile application clients, the connection management server comprising:
  a processor; and
  a memory coupled to the processor, the memory comprising instructions executable by the processor;
receiving, by the connection management server, from the plurality of mobile application clients, a geolocation sharing mode selection, the geolocation sharing mode selection being active mode or inactive mode;
first updating, by the connection management server, the plurality of mobile application clients with geolocation information of each mobile application client in active mode;
informing, by the connection management server, the plurality of mobile application clients with intent status information of each mobile application client in active mode;
determining, a subset of the plurality of mobile application clients in proximity to each other to receive a map display;
delivering, by the connection management server, to the plurality of mobile application clients, the map display;
second updating, by the connection management server, each map display on a geolocation identifier to indicate the geolocation information of each mobile application client in active mode; and
modifying, by the connection management server, on the map display, an intent status modification of a property of the geolocation identifier of each mobile application client in active mode, the intent status modification to indicate the intent status information of the mobile application client in active mode located by the respective geolocation identifier.

16. A method according to claim 15, further comprising:
the geolocation information of each mobile application client in active mode comprising geolocation coordinates of the corresponding mobile user wireless device.

17. A method according to claim 15, further comprising:
the intent status information comprising gender status identity indicator input last received by a user input interface of the corresponding user wireless device.

18. A method according to claim 15, further comprising:
the intent status information comprising a platonic or romantic intent indicator input last received by a user input interface of the corresponding user wireless device.

19. A method according to claim 15, further comprising:
the intent status modification of a property of the geolocation identifier comprising displayable visual indicia selected from a group of displayable visual indicia each indicating different intent status.

20. A method according to claim 19, further comprising:
the group of displayable visual indicia comprising a group of colors.

21. A method according to claim 15, further comprising:
a group of displayable physical representational objects corresponding to the group of colors.

22. A method according to claim 15, further comprising:
the group of displayable physical representational objects comprising a group of color cards each comprising a corresponding one of the group of colors.

23. A method according to claim 22, further comprising:
issuing, by the corresponding mobile user wireless device, via an output thereof a prompt identifying one of the color cards to be displayed to indicate the same intent status modification.

24. A method according to claim 15, further comprising:
determining, by the connection management server, for each other mobile application client, compliance with a geographic location criteria;
wherein the providing of geolocation information to each other mobile application client is limited to a group of compliant each other mobile application client compliant with the geographic location criteria.

25. A method according to claim 24, further comprising:
wherein the geographic location criteria for each other mobile application client is distance between corresponding of the plurality of mobile user wireless devices.

* * * * *